Patented Mar. 16, 1937

2,074,186

UNITED STATES PATENT OFFICE 2,074,186

INSOLUBLE AZODYESTUFFS

Eugene A. Markush, Jersey City, N. J., assignor to Pharma Chemical Corporation, New York, N. Y., a corporation of New York No Drawing. Application August 25, 1933, Serial No. 686,781

4 Claims. (Cl. 260—54)

My invention relates to coloring matters, or dyes, and refers particularly to compounds of this general classification adaptable for coloring or dyeing cellulose fibers.

I have found that valuable compounds suitable for the coloring, or dyeing of cellulose fibers can be produced by combining the diazotized product of compounds having the general formula.

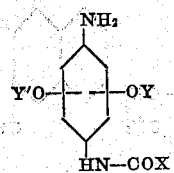

(in which Y and Y' are the same or different alkyl or aryl groups, and X is a hydrocyclic or heterocyclic residue) with a coupling component, such as the arylides of beta-hydroxy-naphthoic acid.

The compounds of my invention may be produced in substance or upon the cellulose fiber.

In producing the compounds of my invention, in substance, the diazotized compound is combined with the coupling component, while in producing them upon the fiber, the fiber may be first treated or impregnated, with the coupling component and the diazotized compound applied thereto, or the fiber treated or impregnated with the coupling component may be converted into my new compound by the application of a stabilized compound of the diazotized product and then subjected to an acid treatment, or the stabilized compound of the diazotized product may be mixed with the coupling component and this mixture applied to the fiber and developed thereon by an acid treatment.

I give the following as an example of the production of a compound of my invention in substance employing a diazotized compound and a coupling component.

Example 1

A mixture of 8.5 parts 2.5 diethoxy-4-furoyl-amino-benzol-1-diazo-imino-proline and 6.9 parts β-hydroxy-naphthoic-acid-orthotoluidide is pasted up with 500 parts of water and 18 parts of sodium hydrate 80° Bé. The mixture is thoroughly stirred and heated to 40° C. until a clear solution results. Acetic or formic acid is added slowly until the solution shows excess of acid and the heating continued. A greenish blue precipitate separates out. The temperature is maintained at 80°–90° C., until no further dye is formed. The dye is filtered, washed thoroughly and dried. The bright blue pigment obtained has excellent properties. Its formula is probably:

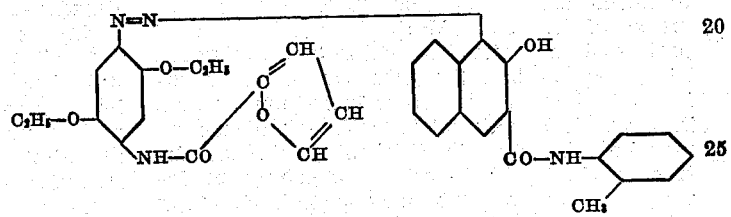

I give the following as an example of the production of a compound of my invention in substance employing a stabilized diazotized compound and a coupling component.

Example 2

The dye of Example 1 may also be formed by combining the diazonium solution as described in Example 1 with paste prepared of 30 parts of β-hydroxy-naphthoic acid ortho toluidide in 500 parts water and 78 parts NaOH 30° Bé. and precipitating finally with acetic acid until neutral and iced to 8° C. When the coupling is complete, the pigment is filtered, washed, dried and ground.

I give the following as an example of the production of one of the compounds of my invention produced on the fiber:

Example 3

8.5 parts of 2:5 diethoxy 4-furoylamino benzol-1-diazo-imino-proline furoylamine-aminobenzol are intimately mixed with 6.9 parts beta-hydroxy - naphthoic-acid ortho-toluidide and stirred with 100 parts of water to a thin paste. To this is now added 18 parts sodium hydrate solution 30° Bé. and 25 parts "Cellosolve". The mixture is heated gently until a clear solution results (about 50° C.) and then thickened with 300 parts of starch-tragacanth paste. The paste is printed on the fibre in the well known manner. After drying, either on the can or in warm air, it is developed in a live steam ager with acetic acid for 3-50 minutes or by immersing in a hot bath containing salt and acetic or formic acid, until maximum intensity is reached. The developed material is then soaped hot, rinsed well and dried. A beautiful brilliant greenish-blue is obtained.

The color can be also obtained on the fibre by using the padding method, the material being padded with 100 parts beta-hydroxy-naphthoic-acid-ortho-toluidide in the usual manner.

The diazonium is prepared by pasting up 33 parts 2.5 diethoxy 4-furoylamino-aniline-hydrochloride in 200 parts of water and 20 parts hydrochloric acid 20° Bé. Cool to 5° C. by means of ice and add slowly a solution of 7 parts sodium nitrite dissolved in 35 cc. of water. The greenish yellow diazonium solution, when finished is then neutralized with sodium acetate. If the padded material is cloth, the diazonium may be printed on by thickening with starch-tragacanth. Padded cloth or hank may be developed in the usual immersion method. Only one-half of the diazonium solution is necessary for the padded material. After printing or immersing with the diazonium the cloth is aged, soaped, rinsed and dried.

I give the following as further examples of the production of compounds of my invention.

*Example 4*

10 parts of the diazo amino compound obtained by combining in alkaline solution the diazonium of 2:5 dimethoxy-4-alpha-pyrollidone-(alpha-carbonylamino)-aniline of the formula,

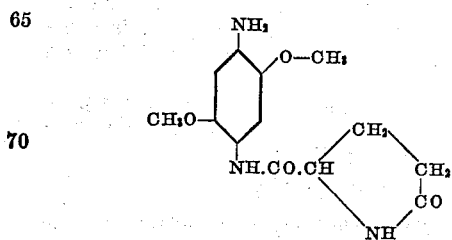

with hydroxy-proline subsequently salted, fil-
tered, and dried are mixed with 8 parts beta-hydroxy-naphthoic-acid-anilide. The mixture if treated and printed as previously described, yields a bright reddish blue of excellent properties.

This mixture may be used also to obtain the dye in substance when the solution is treated with acetic or formic acid as previously described. The pigment is a brilliant reddish-blue powder with excellent properties. Its probable formula is:

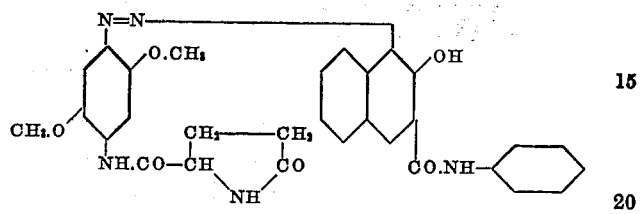

As in Example 3 the dye may also be prepared by combining the diazonium solution with the coupling component or on the goods by the diazonium and the padded material in the manner previously mentioned.

I give the following as further examples of the production of compounds of my invention.

*Example 5*

In a similar manner a clear blue shade of the dye whose probable formula is:

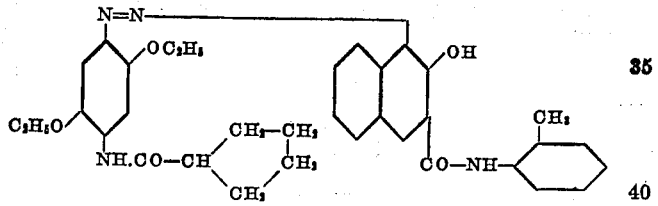

is obtained by treating, as above a mixture of 9 parts 2:5 diethoxy-4 cyclohexyl-carbonyl-aminobenzene-1-diazoimino-proline and 7 parts beta-hydroxy-naphthoic-acid-ortho-toluidide.

Or diazotizing a molecular proportion of the 2:5 diethoxy - 4-cyclohexyl-carbonylamino-aniline and combining it in organic acid medium with a molecular proportion of beta-hydroxy-naphthoic-acid-ortho-toluidide either in substance or on the padded fibre.

*Example 6*

10 parts of the diazo amino compound obtained by combining in alkaline solution the diazonium of 2-methoxy-5-ethoxy-4-alpha-pyrollidone-(alpha-carbonyl-amino)-aniline of the formula,

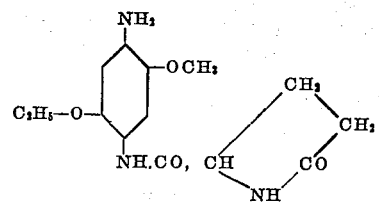

with hydroxy-proline, subsequently salted, filtered and dried, are mixed with 8 parts beta-oxy-naphthoic-acid-anilid. The mixture if treated and printed as previously described, yields a bright marine blue of excellent properties.

This mixture may be used also to obtain the dye in substance when the solution is treated with acetic or formic acid as previously described. The pigment is a brilliant marine blue powder with excellent properties. Its probable formula is:

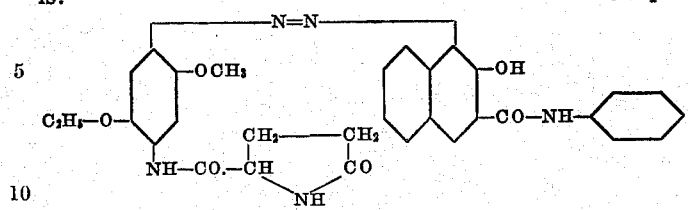

Example 7

100 grams of material (cotton cloth or yarn) are padded with 15 grams of beta-oxy-naphthoic-acid-ortho-toluidide in the usual manner. The so treated or impregnated, material is then placed into a bath containing about 8 grams of 2-ethoxy-5-phenyl-oxy-4-alpha-pyrollidone - (alpha - carbonylamino)-aniline.

After the dye is fully developed, the material is washed in a boiling soap bath, a clear blue dyeing is thus obtained. The probable formula of the dye is:—

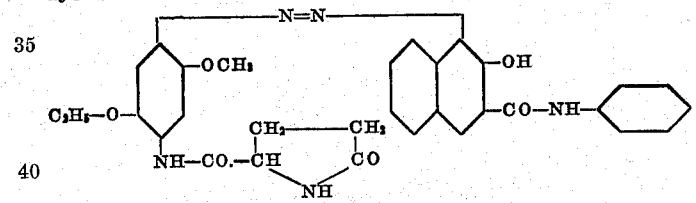

Without limiting myself to the specified compounds, I mention the following as among the diazotizable amines and coupling components which can be employed in the production of the compounds of my invention:

| Diazotized amine | Coupling component | Shade |
| --- | --- | --- |
| 2-amino-4-methyl-5-furoyl-amido-methoxy-benzol | 2,3-hydroxy-naphthoic acid-ortho-anisidide | Clear violet |
| 4-amino-3-6-diphenoxy furoyl amido-benzol | 2,3-hydroxy-naphthoic acid-ortho-toluidide | Bright greenish blue |
| 4-amino-3-6-dimethoxy thiophene-alpha-carboxy-amido-benzol | 2,3-hydroxy-naphthoic acid-o-anisidide | Reddish blue |
| 1-amino-2-5-dimethoxy 4-pyrollidine-alpha carboxy-amido-benzol | 2,3-hydroxy-naphthoic acid-anilide | Clear reddish blue |
| 1-amino-2-5-diethoxy-4-hexahydro-carboxy-amido-benzol | 2,3-hydroxy-naphthoic acid-ortho-toluidide | Clear blue |

It will thus be seen that the compounds of my invention possess valuable coloring or dyeing properties.

I do not limit myself to the particular times, temperatures, quantities, compounds, formulae or steps of procedure specifically mentioned, as these are given simply as a means for clearly describing my invention.

What I claim is:—

1. The process of producing water-insoluble compounds which comprises combining diazotized 2:5 methoxy-4-furoylamine-amino-benzol with beta-hydroxy-naphthoic acid ortho-toluidide.

2. A composition of matter having the formula:

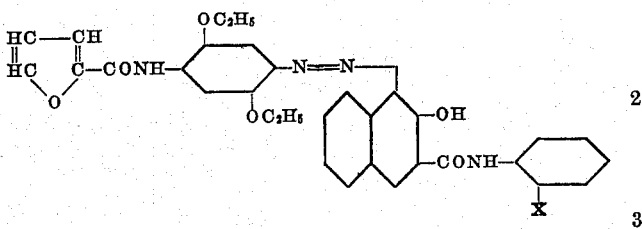

in which X is a member of the group consisting of H, $CH_3$, or $OCH_3$, and which compound is of a bluish color and is insoluble in water.

3. A compound having the formula

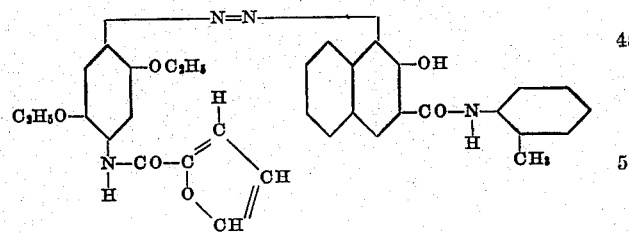

which compound is insoluble in water and is of a bluish color.

4. A compound producible by combining diazotized 2:5 dimethoxy-4-furoylamine-amino-benzol with beta-hydroxy-naphthoic acid ortho-toluidide having the formula

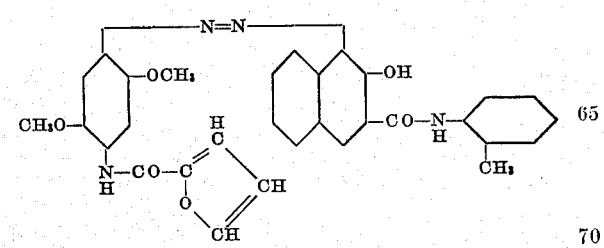

which compound is insoluble in water and is of a bluish color.

EUGENE A. MARKUSH.